J. M. YATER.
FLOAT CONTROLLED VALVE FOR WATER SYSTEMS.
APPLICATION FILED APR. 15, 1916.
1,226,840.
Patented May 22, 1917.
2 SHEETS—SHEET 1.
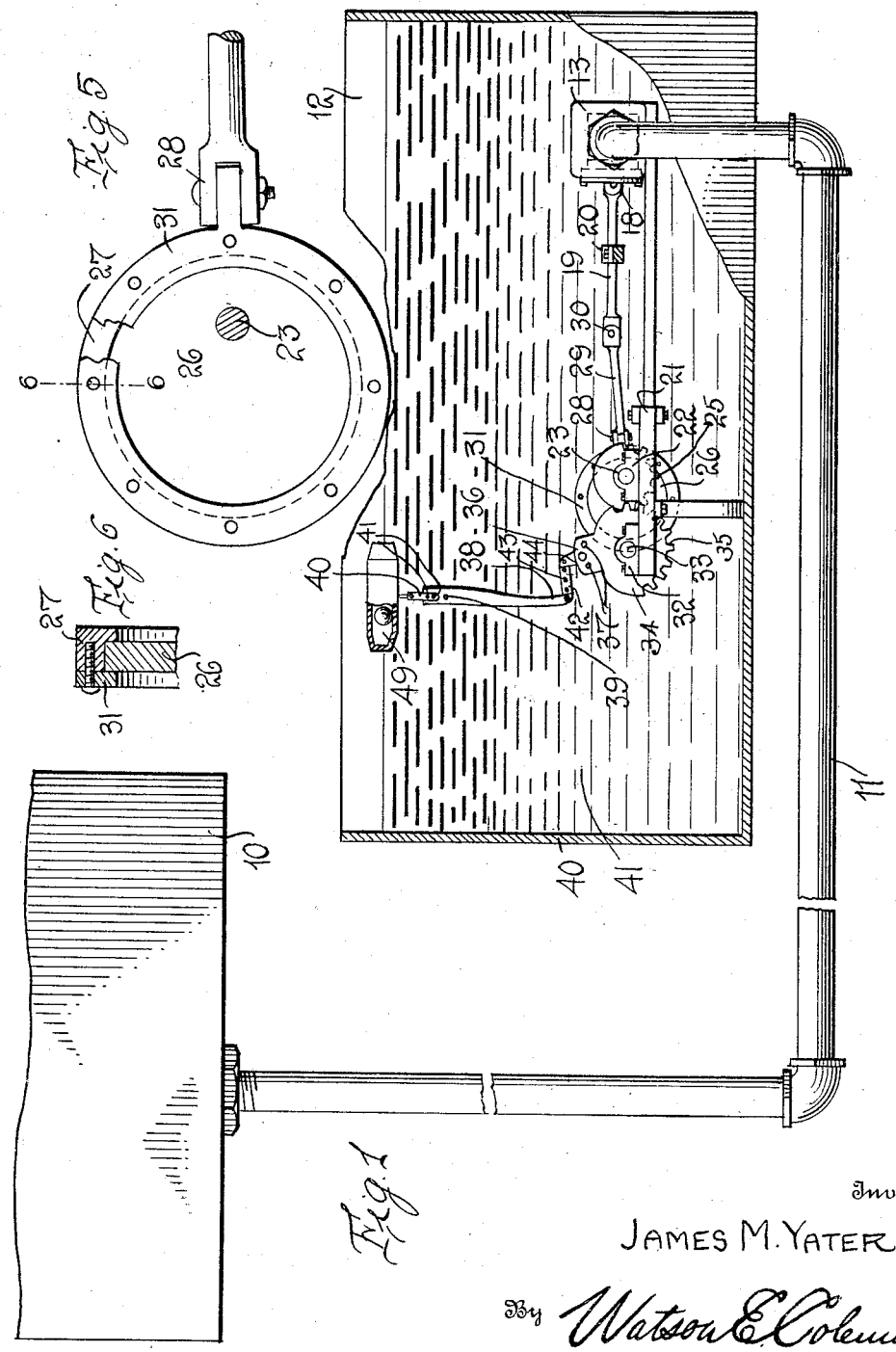
Inventor
JAMES M. YATER
By Watson E. Coleman
Attorney

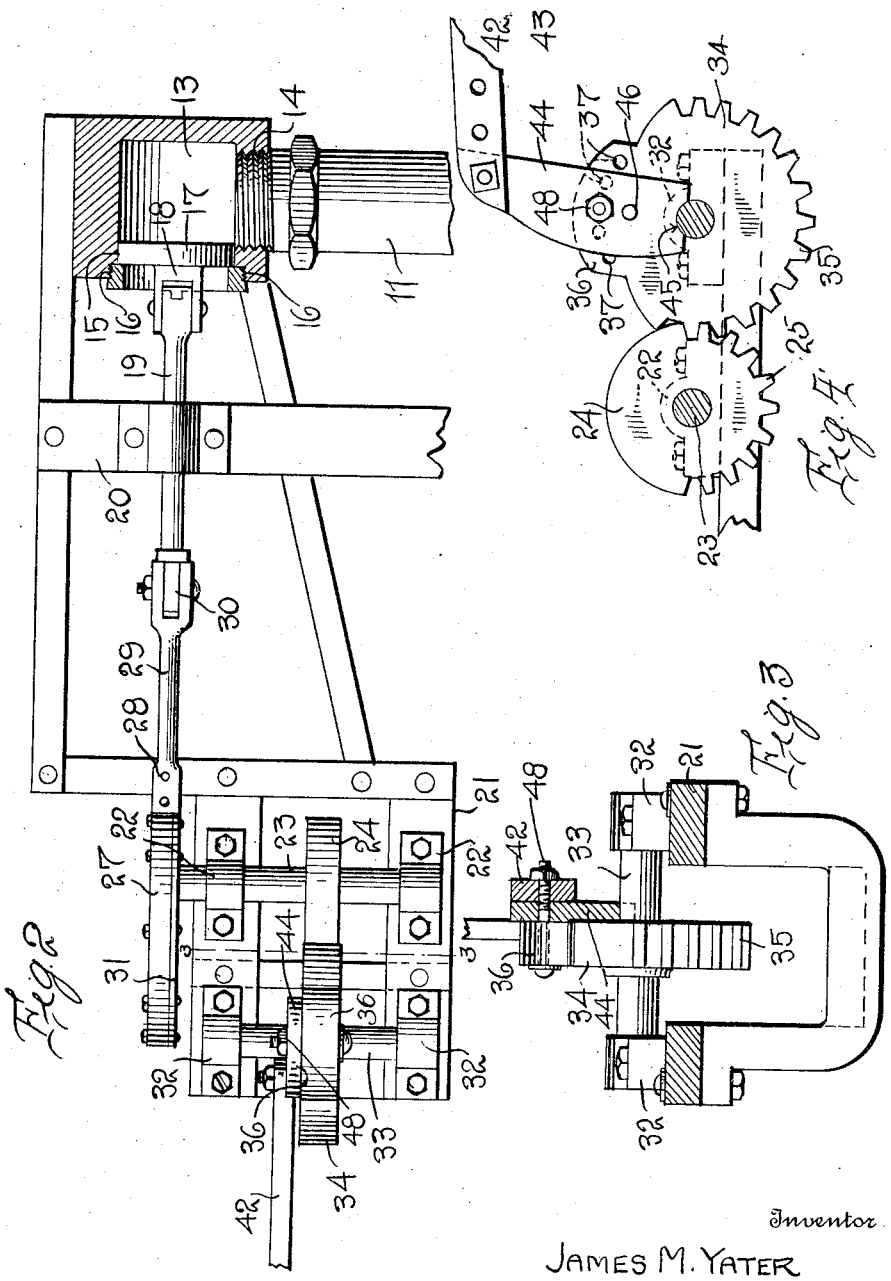

UNITED STATES PATENT OFFICE.

JAMES MADISON YATER, OF NEVADA, MISSOURI.

FLOAT-CONTROLLED VALVE FOR WATER SYSTEMS.

1,226,840.   Specification of Letters Patent.   Patented May 22, 1917.

Application filed April 15, 1916. Serial No. 91,457.

*To all whom it may concern:*

Be it known that I, JAMES M. YATER, a citizen of the United States, residing at Nevada, in the county of Vernon and State of Missouri, have invented certain new and useful Improvements in Float-Controlled Valves for Water Systems, of which the following is a specification, reference being had to the accompanying drawings.

This invention relates to float controlled valve mechanism and particularly to mechanism of this character used in water systems for the purpose of controlling the admission of water from a main tank or source to an auxiliary tank.

The general object of the invention is to provide mechanism whereby when the water in the auxiliary tank sinks beyond a predetermined point a float in the auxiliary tank will cause an inlet valve to open and thus permit the passage of water from the main tank to the auxiliary tank until the level of the water has risen to a point which will cause the float to close the valve.

A further object of the invention is the provision of means whereby the valve will begin to open at the point where the leverage exerted by the float on the float arm is greatest and will begin to close when the float is at that point where its leverage is the greatest so that the resistance to the opening of the valve will not be exerted when the float begins to move downward on the descent of the water and thus prevent the initial movement in the descent of the float, and provide means whereby when the valve has nearly closed and the float is exerting its least leverage on the valve the pressure of the water will cause the valve to close.

Other objects will appear in the course of the following description.

The invention is illustrated in the accompanying drawings wherein:

Figure 1 is a sectional view of an auxiliary tank and an elevation of main tank showing in elevation my float mechanism applied to the auxiliary tank, the float being partly broken away;

Fig. 2 is a top plan view of the valve actuating mechanism;

Fig. 3 is a cross section on the line 3—3 of Fig. 2;

Fig. 4 is a fragmentary side elevation of the sector gears and a portion of the float lever;

Fig. 5 is a fragmentary side elevation of the eccentric partly broken away; and

Fig. 6 is a fragmentary section of the eccentric on the line 6—6 of Fig. 5.

Referring to these drawings it will be seen that I have illustrated my float controlled valve as applied in connection with a water reservoir designated 10 which may be a tank or any other suitable source of water supply which is connected by means of a pipe 11 to an auxiliary tank 12. I have illustrated the pipe 11 as extended directly downwardly from the water reservoir and extending beneath the tank 12 and upward through the bottom of the tank. At its upper end the pipe 11, after it passes through the bottom of the tank 12, is operatively connected to a hollow valve head or casing 13. This valve head or casing is illustrated as square in form and as having an opening 14 at one end which communicates with the pipe 11 and also having an opening 15 disposed at right angles to the opening 14 and in this opening 15 is disposed a removable valve seat 16 which, as illustrated, is annular in form and has screw-threaded engagement with the wall of the opening 15. Disposed in this head or casing 13 and coacting with the valve seat 16 is a piston valve 17 having a bifurcated stem 18 whereby it may be connected to a connecting rod 19 which in turn is guided through a fixed cross-head 20 mounted in any suitable manner upon the supporting frame or base of the mechanism.

The base upon which the mechanism is mounted is designated generally 21 and mounted in bearings 22 on this base is a shaft 23 which carries upon it the sector gear 24, having teeth 25 upon only a portion of its circumference. Mounted upon one extremity of the shaft 23 is an eccentric 26 and surrounding this eccentric is an eccentric strap or ring 27, which is detachably connected as at 28 to the bifurcated end of an eccentric rod 29 whose extremity is bifurcated and is pivotally engaged with the end of the connecting rod 19 as at 30. While I do not wish to limit myself to this particular construction, yet I have illustrated the eccentric 26 as being removably disposed within the eccentric ring or strap 27 and being held in position by the laterally disposed flange or ring 31 which preferably is detachably connected to the eccentric strap and engaged on one side of the eccentric. It will thus be seen that a rotation of the shaft 23 will cause a reciprocation of the several sections of the connecting rod and the reciprocation of the valve 17. The throw of the eccentric 26 is relatively large so that the valve may move from its closed position against the seat 16 to a position beyond the opening 14 and vice versa.

Mounted in bearings 32 upon the base 21 is a countershaft 33 which carries upon it the sector gear 34, a portion of whose periphery is provided with teeth 35 meshing with the teeth 25. Diametrically opposite to the middle tooth of the teeth 35 is a projection 36 formed with a plurality of bolt openings 37 disposed concentrically to the shaft 33. This sector gear wheel 34 is adapted to be actuated by the float and is connected to the float by an adjustable arm as will now be described.

The main portion of the arm consists of a member 38 which is slightly curved at its outer end and is provided with a plurality of perforations 39 with which a shackle 40 is adapted to engage, this shackle being bifurcated and being provided with a plurality of perforations 41. At its opposite end the arm 38 is rigidly but detachably connected to an angularly disposed section 42 which is also provided with a plurality of perforations 43 and detachably and rigidly connected to the section 42 is a head 44 having a rather broad end formed with a concave seat 45 which is adapted to bear against the shaft 33. This head is formed with a plurality of perforations 46 adapted to register with any one of the perforations 37 whereby a bolt 48 may connect this head to the sector gear 34.

The shackle 40 is pivotally connected to a float 49, which is preferably made of copper or galvanized iron and is approximately ten inches in diameter. This float is suitably weighted so that it may be properly submerged when in use. It is to be understood that the base 21 may be of any suitable form and is of course to be suitably braced so that it will be absolutely rigid and is designed to be operatively mounted within the tank 12.

The operation of the invention will be obvious from the above description. Assuming that the valve 17 is in its open position and water is passing into the tank 12, then when the water reaches a predetermined height, the float 49 will be raised, which through the sector gears 34 and 24 will rotate the eccentric 26 in a direction to shift the valve toward the seat 16. After the water continues to rise in the tank 12, the valve will be still further shifted toward the seat until the aperture 15 is entirely closed as in Fig. 1. If now, the water is drawn off from the tank 12 or the level of the water in the tank is otherwise depressed, the float will drop, rotating the eccentric, in a reverse direction causing the valve to shift in an open position. If more water is used up from the tank 12 than can flow in, the float will continue to lower and the valve will be opened wider and wider until the amount of water flowing in is equal to the amount of water flowing out or until the water commences to rise in the tank, when after the water has reached a predetermined height the float will cut off the flow of water.

Now it is to be observed that my mechanism provides for a very smooth, easy and delicate movement of the valve because of the fact that I use an eccentric for operating the valve and that the throw of this eccentric is relatively large. Furthermore, it is to be noted that by reason of the leverage exerted by the arm 38, the relative size of the sector gear 34 in comparison with the sector gear 24 and the relative size of the eccentric 26, I secure relatively great power on the valve so that the valve will open and close notwithstanding the pressure of water against the valve. Further, it will be seen that by using the eccentric I secure a very slow opening and closing of the valve with relative slight motion of the valve at the ends but a relatively quick movement of the valve at the middle portion of its stroke. Thus if the height of the water is very suddenly or quickly decreased, then the valve will open quickly to the extent required to permit water to pass freely into the tank. Further, if the water passes quickly into the tank, the valve will close quickly until it nears a position in immediate proximity to the seat when it closes relatively slowly. It will be noted that the pressure of water normally holds or urges the valve to its seat. It will likewise be noted that when the float is in the position shown in Fig. 1 it exerts its least leverage upon the sector gear 34 and, therefore, exerts the least power to open the valve, assuming that the water in the tank is sinking. The leverage of the float and its arm 38 increases, however, as the float descends, the float moving in a circle whose axis is the shaft 45. As the float moves downward, the arm exerts a constantly increasing leverage and has more power to open the valve. It will be seen from Figs. 1 and 2 when the tank is full and the float is at its highest point, the eccentric 26 has its major axis disposed in alinement with the connecting rod and the valve stem. Now as the water sinks and the float moves downward, the eccentric 26 will move in a clockwise direction in Fig. 5 but during the first part of the downward movement of the float this eccentric tends simply to lift the eccentric ring and to move the eccentric ring forward very little if any and, therefore, move the valve stem 19 forward very little if any. As the float arm 38 moves downward, however, and reaches a certain point, the action of the eccentric is to open the valve. This motion is relatively slow at this point but relatively powerful which it has to be in order to open the valve against the pressure of water in the chamber 13. As the leverage of the float increases, however, the speed of the opening movement increases and less power is exerted by the eccentric and less power is needed for the reason that by this time the valve is to a large extent balanced and there is more or less equal pressure on both sides of the valve. When the float has reached its lowest position, the valve is fully open and the eccentric is disposed oppositely to the showing in Fig. 5. If the float arm 38 descends to such an extent that it is horizontal, the valve is partially open but the eccentric 26 has then shifted to such position that the initial upward movement of the float will exert great power upon the valve so that it may close even against the pressure of the water in front of the valve. As the float rises, however, the leverage of the float decreases just as the water pressure in front of the valve decreases while the water pressure behind the valve increases so that the decreased leverage of the float is compensated for and when the float has reached its highest point, the action of the float is relatively weak but the power of the water then causes the valve to close tightly against its seat and holds the valve closed. Slight variations in the water level, therefore, will not affect the valve and cause a leakage of water past the valve seat because the water will hold the valve to its seat until the float has lowered quite a little.

It is to be noted that with my construction, the arm 38 is vertical when the float is at its highest point. The manner in which I apply power to the valve is such, however, that I can allow this float arm to be approximately vertical under normal circumstances and yet secure power to operate the valve as the water lowers. It will be seen that considering the purpose for which it is designed, the mechanism is relatively simple and yet substantial and that there are no parts which are likely to get out of order. The leverage exerted by the float can be controlled by adjusting the head 44 upon the member 42, and the height of the arm may be changed by shifting the shackle 40 along this arm.

While I have illustrated several features which I believe to be of particular practical value, I wish to be understood that the mechanism may be modified in many minor respects without departing from the spirit of the invention.

Having described my invention, what I claim is:

1. A float operated valve controlling mechanism including a valve chamber having an inlet and an outlet port, a valve normally held to its seat by the pressure of water within the chamber and shiftable across the inlet port, a shaft, an eccentric thereon, an eccentric ring operatively connected to the valve and mounted on the eccentric, a float arm operatively connected to the shaft, and a float thereon, the eccentric having its major axis extending in alinement with the axis of the valve when the valve is closed and the float is raised to its full height and the float arm is approximately vertical.

2. A float operated valve controlling mechanism including a valve chamber having an outlet opening at one end and an inlet opening at right angles to the outlet opening, a piston valve therein seating against the outlet opening and shiftable across the inlet opening whereby the valve will be normally held to its seat by the pressure of water within the valve chamber, a shaft extending at right angles to the direction of movement of the valve, an eccentric thereon disposed in alinement with the axis of the valve and operatively connected to the valve, a second shaft, a float arm operatively connected to the second named shaft, a float thereon, and gearing between the second named shaft and the first named shaft, the eccentric having its major axis extending in alinement with the axis of the valve when the valve is closed and the float is raised to its full height and the float arm is approximately vertical.

3. A float operated valve controlling mechanism including a valve chamber having an outlet port and an inlet port at right angles to the outlet port, a valve longitudinally shiftable through the chamber and moving across the inlet port whereby the pressure of water will normally urge the valve to its seat, a shaft, an eccentric mounted on the shaft, an eccentric ring mounted on the eccentric and operatively connected to the valve, a sector gear on the shaft, a sector gear meshing with the first named sector gear, and a float supporting arm attached to the second named sector gear at a point approximately diametrically opposite to the middle of the toothed face of the sector gear and carrying a float at its extremity.

4. A float operated valve controlling mechanism including a valve chamber having an outlet port and an inlet port at right angles to the outlet port, a valve longitudinally shiftable through the chamber and moving across the inlet port whereby the pressure of water will normally urge the valve to its seat, a shaft, an eccentric mounted on the shaft, an eccentric ring mounted on the eccentric and operatively connected to the valve, a sector gear on the shaft, a sector gear meshing with the first named sector gear, an arm attached to the second named sector gear, a float arm having an angular extension connected at its end to the arm attached to the sector gear, and a float pivotally connected to the float arm.

5. A float operated valve controlling mechanism including a valve chamber having an outlet port and an inlet port at right angles to the outlet port, a valve longitudinally shiftable through the chamber and moving across the inlet port whereby the pressure of water will normally urge the valve to its seat, a shaft, an eccentric mounted on the shaft, an eccentric ring mounted on the eccentric and operatively connected to the valve, a sector gear on the shaft, a sector gear meshing with the first named sector gear, an arm attached to the second named sector gear, a float arm having an angular extension connected at its end to the arm attached to the sector gear, and a float pivotally connected to the float arm, the angular extremity of the float arm having adjustable connection with the arm of the sector gear whereby to increase or decrease the leverage of the float.

In testimony whereof I hereunto affix my signature in the presence of two witnesses.

JAMES MADISON YATER.

Witnesses:
HUGH WILKINSON,
EUGENE WILKINSON.

Copies of this patent may be obtained for five cents each, by addressing the "Commissioner of Patents, Washington, D. C."